(12) United States Patent
Bastide et al.

(10) Patent No.: US 8,949,729 B2
(45) Date of Patent: Feb. 3, 2015

(54) ENHANCED COPY AND PASTE BETWEEN APPLICATIONS

(75) Inventors: Paul R. Bastide, Boxford, MA (US); Ralph E. LeBlanc, Jr., Pepperell, MA (US); Fang Lu, Billerica, MA (US); Alaa Abou Mahmoud, Dracut, MA (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 13/495,755

(22) Filed: Jun. 13, 2012

(65) Prior Publication Data

US 2013/0339889 A1 Dec. 19, 2013

(51) Int. Cl.
*G06F 3/048* (2013.01)
*G06F 17/24* (2006.01)
*G06F 3/01* (2006.01)

(52) U.S. Cl.
CPC .............. *G06F 17/24* (2013.01); *G06F 17/241* (2013.01)
USPC ............ 715/770; 715/764; 715/765; 715/769

(58) Field of Classification Search
CPC . G06F 17/24; G06F 17/241; G06F 17/30011; G06F 17/3089
USPC .................. 715/764, 765, 769, 770
See application file for complete search history.

(56) References Cited

U.S. PATENT DOCUMENTS

| | | | |
|---|---|---|---|
| 6,028,602 A * | 2/2000 | Weidenfeller et al. | 715/781 |
| 6,636,250 B1 * | 10/2003 | Gasser | 715/853 |
| 6,985,898 B1 * | 1/2006 | Ripley et al. | 1/1 |
| 7,383,499 B2 | 6/2008 | Kraft et al. | |
| 7,392,475 B1 * | 6/2008 | Leban et al. | 715/255 |
| 8,555,186 B2 * | 10/2013 | Sahai et al. | 715/770 |
| 8,555,187 B2 * | 10/2013 | Margolin | 715/770 |
| 8,572,511 B1 * | 10/2013 | Barnett et al. | 715/848 |
| 8,677,274 B2 * | 3/2014 | Runov et al. | 715/816 |
| 2002/0087602 A1 * | 7/2002 | Masuda et al. | 707/515 |
| 2004/0205467 A1 | 10/2004 | Kofman et al. | |
| 2006/0282779 A1 | 12/2006 | Collins et al. | |
| 2007/0061747 A1 | 3/2007 | Hahn et al. | |
| 2008/0052623 A1 * | 2/2008 | Gutfleisch | 715/713 |
| 2008/0201656 A1 | 8/2008 | Kim et al. | |
| 2011/0035759 A1 * | 2/2011 | Williams et al. | 719/328 |
| 2013/0007671 A1 * | 1/2013 | Hammontree et al. | 715/853 |
| 2013/0246039 A1 * | 9/2013 | Duneau | 704/2 |

OTHER PUBLICATIONS

WebSphere , "Creating a Web Clipping Portlet," http://publib.boulder.ibm.com/infocenter/wpdoc/v6r0/topic/com.ibm.wp.e, IBM Corporation, 2000, 2009.

* cited by examiner

*Primary Examiner* — Nicholas Augustine
(74) *Attorney, Agent, or Firm* — Convergent Law Group LLP (57) ABSTRACT

Enhanced copying and pasting between applications includes capturing information about open applications including a screenshot of each of the open applications shown in a viewable area of the open applications; in response to receiving a copy command while the user is interacting with a first application, presenting the screenshots of the other open applications to the user for selection; in response to the user selecting one of the screenshots corresponding to a second application, displaying visual content segments from the second application; in response to receiving a user selection of two or more of the visual content segments, copying the selected visual content segments; and inserting the selected visual content segments into the first application such that original spatial relations between the visual content segments from the second application are maintained when the visual content segments are inserted into the first application.

25 Claims, 5 Drawing Sheets

ENHANCED COPY AND PASTE BETWEEN APPLICATIONS

BACKGROUND

In computer parlance, the phrases "copy and paste" typically refer to commands that enable a user to transfer material, such as text, data, files or objects from a source, such as a page of a document, to a destination, such as another page of the document. The user first selects the material, and then activates the copy command to create a duplicate instance of the material. The copied material is then temporally saved in a "clipboard." The user places a cursor in a different position and then activates the "paste" command to transfer the material from the clipboard to the position where the paste command is issued. This operation is typically used with a graphical user interface that uses pointing devices such as a computer mouse, or by a drag-and-drop interaction, for example.

The copy and paste commands may also be used to transfer material from one application to another application. However, copying and pasting between applications can be cumbersome for the user. To illustrate, consider the example where a computer user has opened a document editor, a browser, an e-mail application, and that the document editor is currently in focus. If the user desires to transfer data from the e-mail application to the browser, the user must first change context from the document editor to the e-mail application, copy the data from the e-mail application, and then return back to the document editor to paste the copied data.

With conventional cut and paste commands, the user may linearly select a first, second and third elements from the source, but when this data is pasted to the destination application, the elements may be inserted into the destination application either in a top down or left right layout. Consequently, the user must then edit the pasted data into a form that fits the destination's purpose. For example, the user might have to move the pasted elements to the right location and/or within certain elements, or delete content, such as a header or footer, for instance. The context switching between applications, coordinating and editing of the inserted data requires steps which lead to extra work to produce a quality product.

Accordingly, a need exists for an improved method and system for copying and pasting between applications.

BRIEF SUMMARY

Exemplary embodiments disclose a method and system for enhanced copying and pasting between applications. Aspects of the exemplary embodiment include capturing information about open applications including a screenshot of each of the open applications shown in a viewable area of the open applications; in response to receiving a copy command while the user is interacting with a first application, presenting the screenshots of the other open applications to the user for selection; in response to the user selecting one of the screenshots corresponding to a second application, displaying visual content segments from the second application; in response to receiving a user selection of two or more of the visual content segments, copying the selected visual content segments; and inserting the selected visual content segments into the first application such that original spatial relations between the visual content segments from the second application are maintained when the visual content segments are inserted into the first application.

DETAILED DESCRIPTION

The present invention relates to methods and systems for enhanced copying and pasting between applications. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The exemplary embodiments provide methods and systems for enhanced copying and pasting between applications. The exemplary embodiments provide a software module executing on a computer that coordinates capturing, segmenting and inserting visual context from one application into another application. Advantages include an improved user experience and reduced user context switching between multiple applications. In addition, the exemplary embodiments enable developers and users to selectively capture content segments when copying and pasting into an application while reducing the need to edit the content once the content is inserted into the other application.

Figure 1:
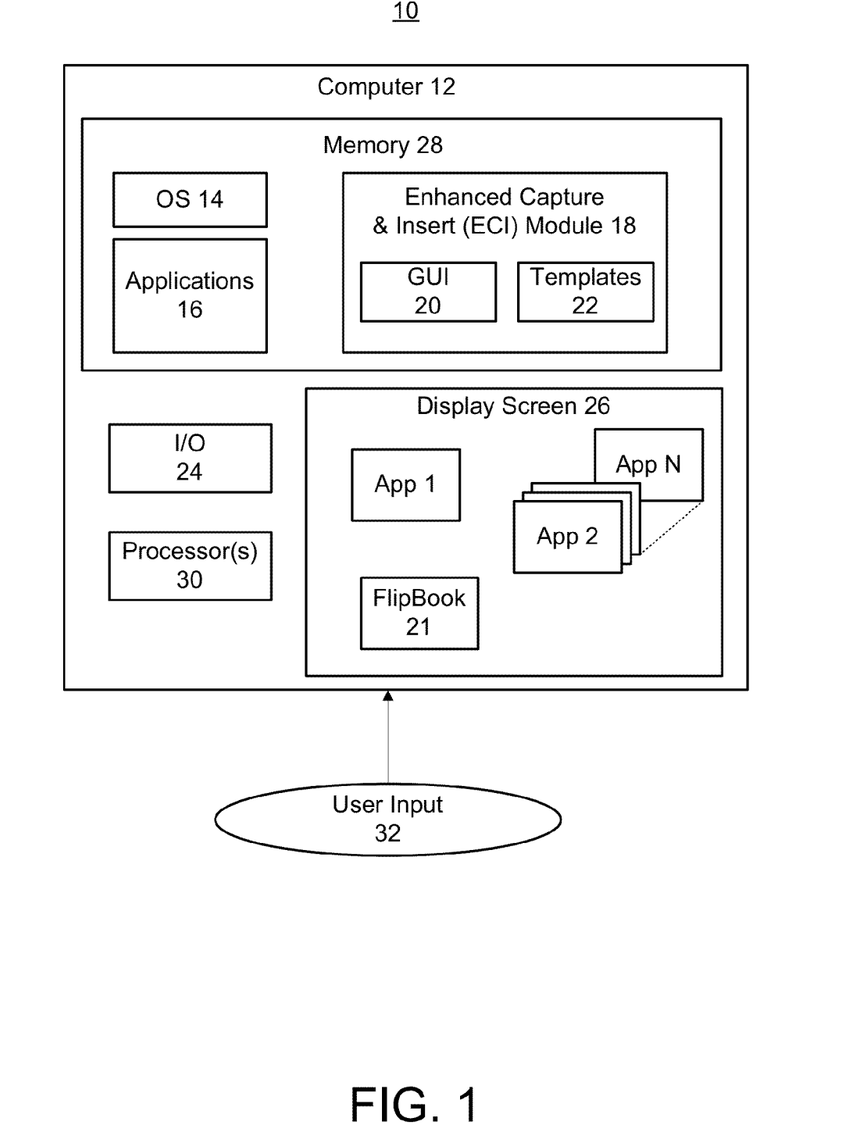
FIG. 1 is a logical block diagram illustrating an exemplary system environment for implementing one embodiment of enhanced copying and pasting between applications.

FIG. 1 is a logical block diagram illustrating an exemplary system environment for implementing one embodiment of enhanced copying and pasting between applications. The system 10 includes a computer 12 having an operating system 14 capable of executing various software applications 16. The software applications 16 may be controlled by a user with pointing devices, such as a mouse or stylus, and/or may be touch screen enabled, which enables the applications be used with a variety of pointing devices, including the user's finger and various types of styluses.

During operation, opening and running the software applications 16 (App 1 through App N) may display objects such as text, video, images and icons in a window, view, or page on a display screen 26. Example types of applications 16 may include a web browser, a word processor or document editor, a spreadsheet, a presentation application and the like. The application 16 that a user of the computer 12 is currently interacting with is said to be the active application or the application that is in focus. Periodically, a user may wish to copy material from one application to another.

According to an exemplary embodiment, an enhanced capture and insert (ECI) module is provided that enables the user to copy and paste material between applications 16 in a more efficient manner. The ECI module 18 is configured to insert into a first application visual content copied from a second application with minimal need for the user to switch context between the applications 16. In one embodiment, the ECI module 18 may either interact with or bypass traditional "clipboards" that are used to implement conventional cut and paste commands.

In one embodiment, the ECI module 18 may be implemented as a standalone application or as a plug-in for the application 16. In one embodiment, the ECI module 18 includes a graphical user interface (GUI) 20 and a variety of templates 22. In one embodiment, the GUI 20 includes a copy-and-paste toolbar that may be displayed within at least one of the applications 16 to enable the user to invoke enhanced copy and paste commands. The ECI module 18 utilizes the templates 22 for aiding in segmenting material to be copied from the other application 16 into visual context, as explained further below. In response user input 32 that invokes an enhanced copy command from the toolbar, the GUI 20 may display a user interface element such as a flipbook 21 that shows a screenshot taken for each of the open applications 16. The flipbook 21 allows the user to select one or more of the visual context for automatic pasting into the application from which enhanced copy command was invoked.

Although ECI module 18 is shown as a single component, the functionality provided by the ECI module 18 may be implemented as more than one module or may be incorporated into an application 16 or the operating system 14.

The computer 12 may exist in various forms, including a personal computer (PC), (e.g., desktop, laptop, or notebook), a tablet, smart phone, a set-top box, a game system, and the like. The computer 12 may include modules of typical computing devices, including input/output (I/O) devices 24. Examples of typical input devices may include keyboard, pointing device, microphone for voice commands, buttons, touch screen, etc., and an example of an output device is a display screen 26. The computer 12 may further include computer-readable medium, e.g., memory 28 and storage devices (e.g., flash memory, hard drive, optical disk drive, magnetic disk drive, and the like) containing computer instructions that implement the application 16 and an embodiment of ECI module 18 when executed by a processor.

A data processing system suitable for storing and/or executing program code includes at least one processor 30 coupled directly or indirectly to when one or more memory elements through a system bus. The memory 28 can include local memory employed during actual execution of the program code, bulk storage, and cache memories which provide temporary storage of at least some program code in order to reduce the number of times code must be retrieved from bulk storage during execution.

The I/O devices 24 can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

As an alternative embodiment, the system may be implemented as a client/server model, where a website or application offers the enhanced copy and insert capability as part of a web solution, e.g., a web editor.

Figure 2:
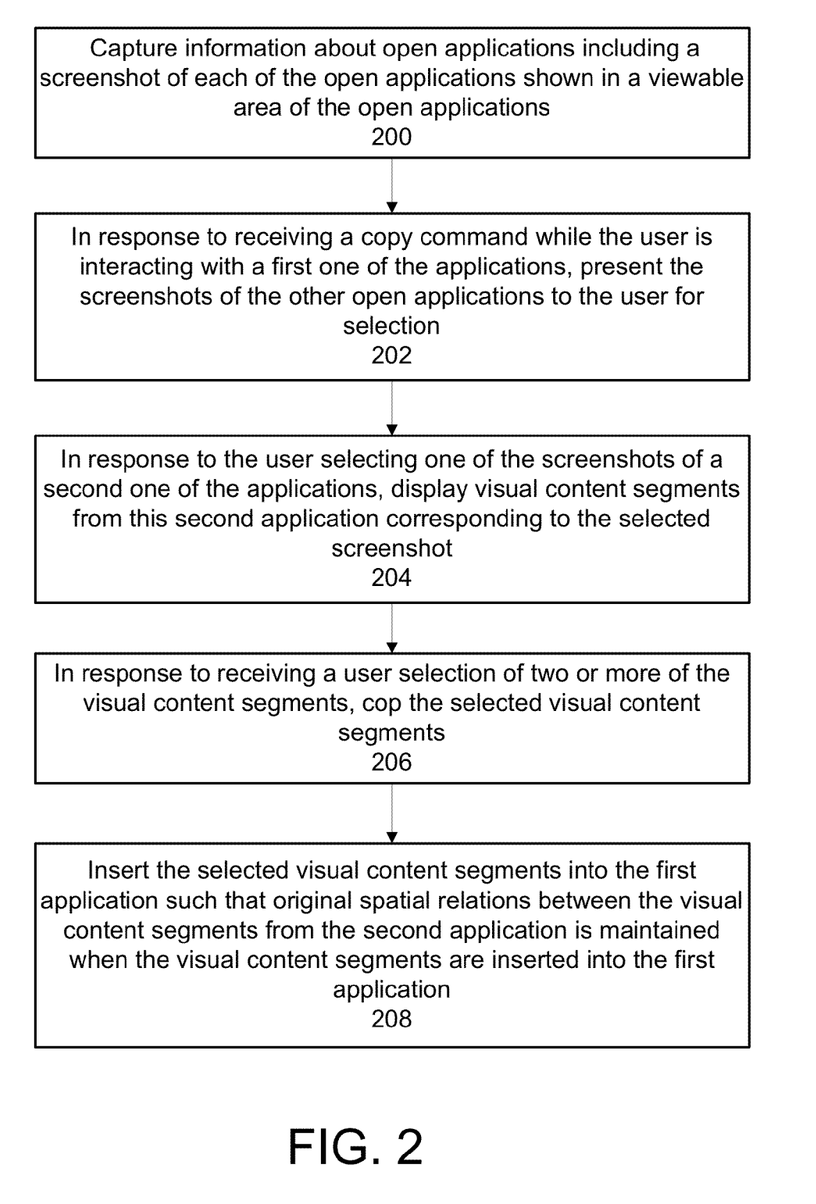
FIG. 2 is a diagram illustrating a process for dynamically magnifying logical segments of a view according to an exemplary embodiment.

FIG. 2 is a diagram illustrating a process for enhanced copy and paste between applications according to an exemplary embodiment. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The process may begin by the ECI module 18 capturing information about open applications including a screenshot of each of the open applications shown in a viewable area of the open applications (block 200). Upon startup the ECI module 18 may query the operating system 14 to capture contextual data, i.e., a list of titles and a screenshot of open applications 16 that record visible items displayed on the display screen 26. In one embodiment, the ECI module 18 may obtain the screenshots from the operating system 14 or other screen capture software. Further, the process of capturing the visual context data may occur upon a context change in each application and/or on-demand of the user.

In response to receiving a copy command while the user is interacting with a first one of the applications, the ECI module 18 present the screenshots of the other open applications to the user for selection (block 202). The presentation may be initiated in response to the user clicking on a user interface mechanism, such as a button or toolbar that the GUI 20 of ECI module 18 displays within one or more of the open applications 16. While interacting with the application 16, the user may click on the toolbar to begin the enhanced copy and paste process.

Figure 3:
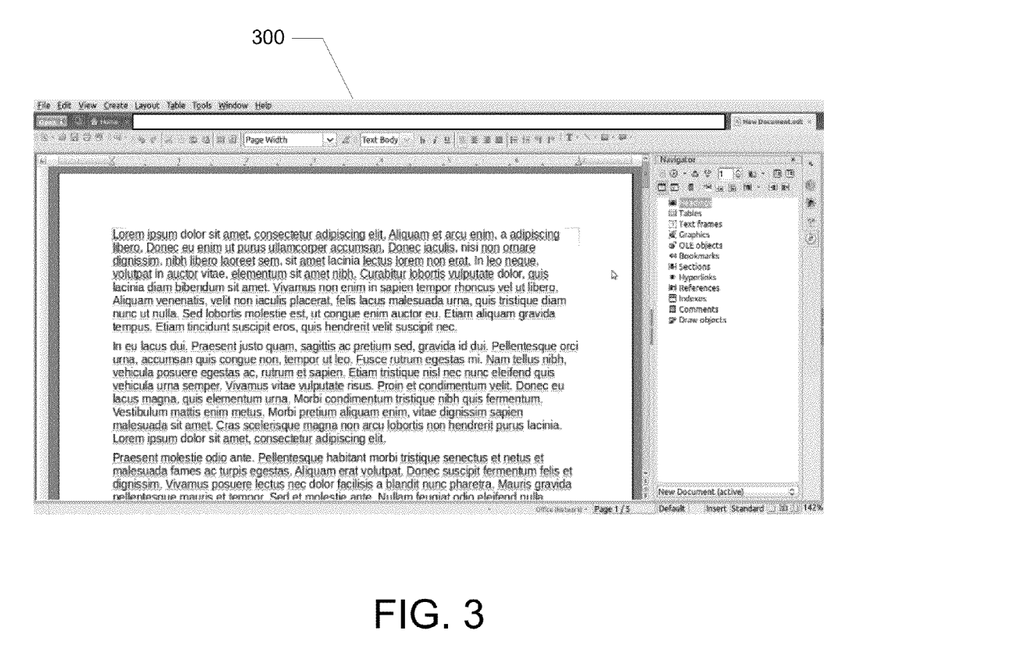
FIG. 3 is a block diagram illustrating an example of user interacting with a document editor application, which is the application having the primary focus.
Figure 4:
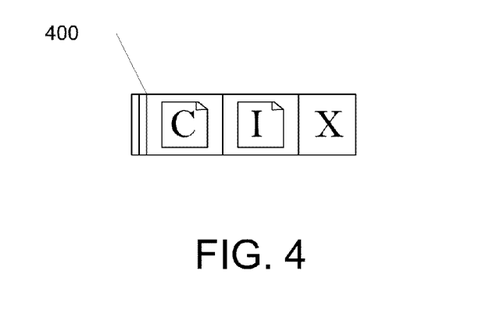
FIG. 4 is a block diagram illustrating an example ECI toolbar that may be displayed for use while the user is interacting with the document editor.

FIG. 3 is a block diagram illustrating an example of the user interacting with a document editor 300 application, which is the application 16 having primary focus. FIG. 4 is a block diagram illustrating an example ECI toolbar 400 that may be displayed while the user is interacting with the document editor 300. The ECI toolbar 400 may include a copy button (C) for copying visual context information from another application 16, a paste (P) button for inserting the copied the visual context information into the current application, and a close button (X) for closing the ECI module 18.

According to one aspect of the exemplary embodiment, in response to the user clicking on the insert button, the ECI module 18 may present the visual context data from the other open applications, such as the title and screenshots, by displaying the visual context data in a user interface element. The interface element is displayed for user selection and copying of the visual context data from one of the other applications 16. In one embodiment, the ECI module 18 may place the most recently accessed applications in front of the user interface element to present the most likely candidates for copying. In addition, the ECI module 18 may capture the content of open tabs in the applications.

In the exemplary embodiment, the user interface element is implemented as an electronic flipbook 21 having at least one page showing the visual context data of the open applications. Another implementation for the user interface element may include a selection list with a preview panel. In this embodiment, the flipbook 21 may be displayed as a window having a series of pages that the user may cause to turn or "flip", where the title and screenshot for each application is shown on a separate page of the flipbook 21. In another embodiment, the flipbook 21 may be implemented such that the titles and screenshots of multiple open applications are shown on a page of the flipbook 21.

Figure 5:
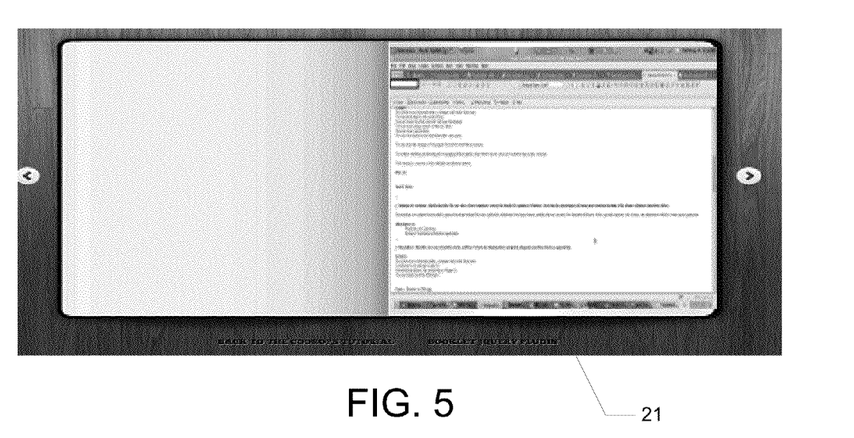
FIG. 5 is a block diagram graphic illustrating an example presentation of open applications using a flipbook.

FIG. 5 is a block diagram graphic illustrating an example presentation of open applications using a flipbook 21. Clicking the left and right arrows allows the user to scroll through pages of screenshots of the open applications.

Referring again to FIG. 2, in response to the user selecting one of the screenshots of a second application, the ECI module 18 displays visual content segments from the selected screenshot (block 204).

Figure 6:
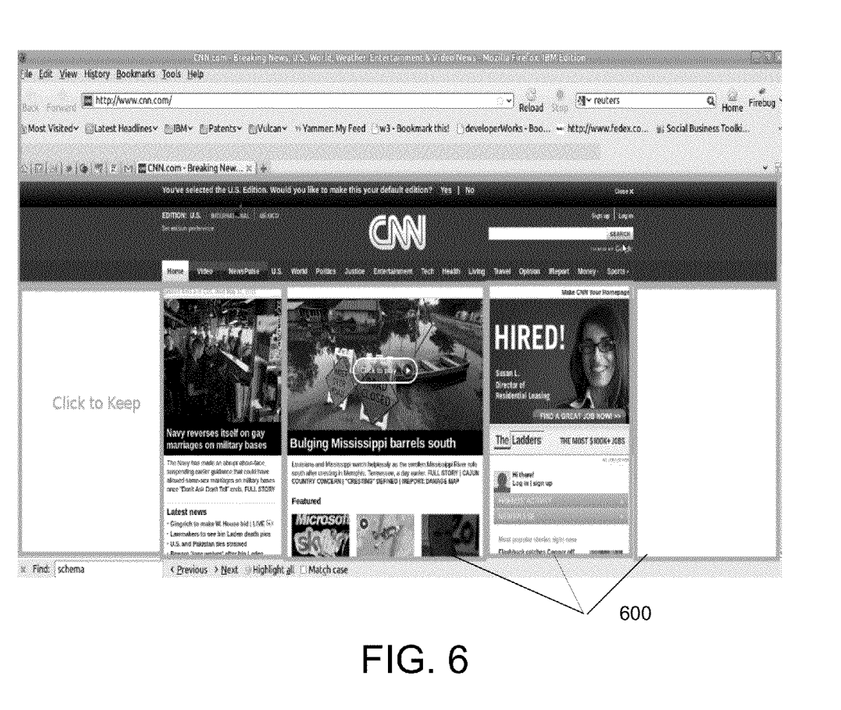
FIG. 6 is a block diagram illustrating the visual content segments that are user selectable for copying from the chosen application.

FIG. 6 is a block diagram illustrating the visual content segments that are selectable by the user for copying from the chosen application. In this embodiment, the selectable visual content segments 600 are indicated with highlighted borders. In this particular example, the user has chosen to copy segments from a browser showing portions of the CNN™ website, and seven selectable visual content segments 600 are shown for user selection.

In one embodiment, the ECI module 18 captures the visual context including borders of elements comprising visual content from the applications in the flipbook 21 by finding one of the templates 22 that best defines a layout for each of the applications 16. The templates 22 may be a defined layout or style that identifies logical blocks, shapes or segments, which define the borders of the visual content. If a template 22 is found that matches a layout of the application 16 within a predefined threshold, ECI module 18 applies a template style to the layout of the screenshot, whereby the segments are defined. The ECI module 18 may store and retrieve layouts associated with a particular application so as to not repeat the finding of the correct layout.

If a matching template 22 cannot be found, then the ECI module 18 searches for edge boundaries in the screenshot. In one embodiment, the ECI module 18 may use CSS and HTML style artifacts in order to determine edge boundaries. If the edge boundaries can be found, then ECI module 18 describes the edge boundaries to the layout of the application or browser. The ECI module 18 manipulates the visual style of the application in order to artificially generate a series of visual borders. This would be done out of sight of the user, and the system may present the discovered segments, or most logical segment or layout to the user. The borders may be found using image scanning or computer vision algorithms. Further the system may scan the underlying markup for key identifiers such as an ID of a footer or header or table which are typically in the markup of the HTML—and may be presented in various degrees of resolution. If the ECI module 18 is unable to find edge boundaries, then the ECI module 18 may present the user with predefined layout segments or wireframes, which may be selected and applied to the screenshot of the selected application 16. The ECI module 18 then displays the segments, edge boundaries, or wireframes for user selection, as shown in FIG. 6. In an alternative embodiment, the process of capturing the visual context comprising visual content from the applications may be performed as part of step 202.

Referring again to FIG. 2, in response to receiving a user selection of two or more of the visual content segments, the ECI module 18 copies the selected visual content segments (block 206). In one embodiment, the user may select the content segments within the window in which he is interested by clicking on the content segments with a mouse. Alternatively, rather than clicking on the content segments, the user may also select the content segments freehand (e.g., a range or lasso selection), and the user may select more than one segment. In a further embodiment, the ECI module 18 may further breakdown the segments from an image of the application window to generate sub-segments in response to a user input such as a double click. Further, any generated layout may be shared with any third party.

Figure 7:
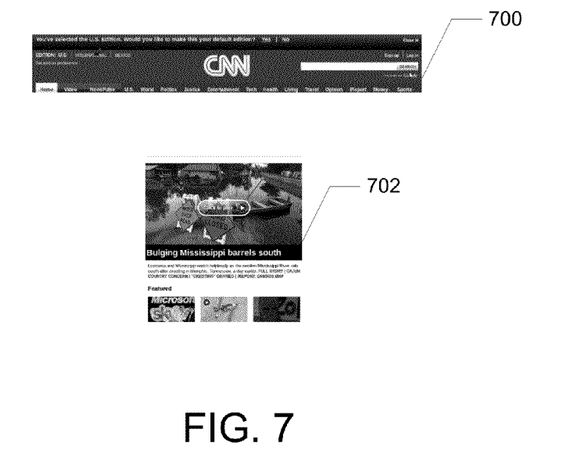
FIG. 7 is a block diagram showing examples segments selected by the user.

FIG. 7 is a block diagram showing examples segments selected by the user. In this particular example, user has selected two segments: the CNN banner as one segment 700 and an image regarding a flood story as a second segment 702.

This is ECI module 18 may be configured to use any template style, automation or both to break down and make the selection easy for the user/application. Geometric-based determination of segments is a visual determination that may be ideal for legacy applications. Object-based determination of segments may be ideal for layouts that correspond to a set of nodes or OLE objects, which are not part of the host application. Also, a visual breakdown of the segments may further be used.

In a further embodiment, the ECI module 18 may be configured with rules or policies that restrict copying of specified content segments or sections of the application. For example, predefined rules may include omitting a segment, restricting a segment to include an attribution such as a watermark, and/or allowing the copying of all segments. Finally, the ECI module 18 may be configured to highlight sections of the application can be copied. The highlighting may be implemented using style manipulation, overlays or, coloring of the rich client application.

In response to the user selecting one or more segments, ECI module 18 may breakdown the segments by taking the geographic representation of the segment, or if the user specifies, the ECI module 18 and take a text representation of the segment using optical character recognition (OCR) to convert the image to text, rather than using the image.

Referring again to FIG. 2, the ECI module 18 inserts the selected visual content segments into the first application such that original spatial relations between the visual content segments from the second application are maintained when the visual content segments are inserted into the first application (block 208).

Figure 8:
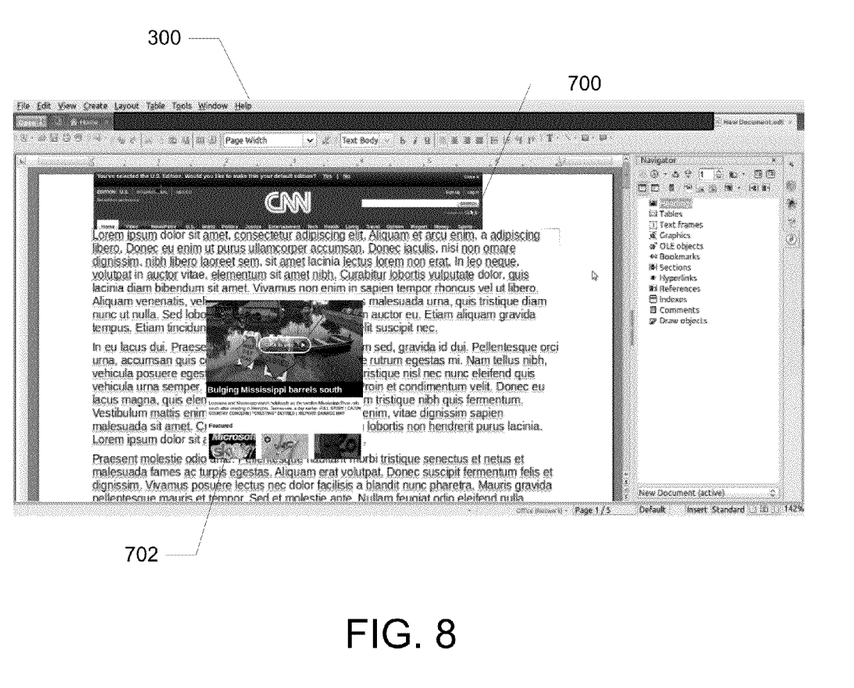
FIG. 8 is a block diagram illustrating visual content segments being inserted into the document editor.

FIG. 8 is a block diagram illustrating visual content segments 700 and 702 being inserted into the document editor 300. The segments are extracted using X-Y coordinates of the segment areas and the user selection. The segments are broken down and inserted using either existing copy and paste methods, or inserting using an application programming interfaces (API). The ECI module 18 may further breakdown objects to constituent elements, including 1) graphics by screen grabbing the graphic elements, 2) text using OCR, 3) text styles by screen grabbing the graphic elements, and 4) objects may be converted into snapshots of the state they were last in, e.g., flash may be used to insert into an image representing a set or a preferred state of the object. Further PCI module may leverage automation APIs in order to paste specific segments in the document.

The ECI module 18 may be configured to use the templates to map the objects in the clipboard to where they should go in the destination document. The paste command occurs through a mixing of objects and automation APIs, which may call the native clipboard or application, which originates the copy/paste action and inserts the corresponding elements in place. These techniques are well known in OpenOffice.org APIs, Microsoft Office APIs and other technologies, and need not be described in detail here.

A system and method for enhanced copying and pasting between applications has been disclosed. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A computer-implemented method for enhanced copying and pasting between applications, the method performed by program instructions executed on a computer having at least one processor, the method comprising:
   capturing information about open applications including a screenshot of each of the open applications shown in a viewable area of the open applications;
   in response to receiving a copy command while the user is interacting with a first application, presenting the screenshots of the other open applications to the user for selection;
   in response to the user selecting one of the screenshots corresponding to a second application, displaying visual content segments from the selected screenshot;
   in response to receiving a user selection of two or more of the visual content segments, copying the selected visual content segments; and
   inserting the selected visual content segments into the first application such that original spatial relations between the visual content segments from the second application are maintained when the visual content segments are inserted into the first application.

2. The method of claim 1 wherein capturing information about open applications further includes querying an operating system to capture visual context data including a list of titles and the screenshot of the open applications that record visible items displayed on the display screen.

3. The method of claim 2 further comprising capturing the visual context data upon at least one of a context change in each application and on-demand of the user.

4. The method of claim 1 wherein presenting the screenshots of the other open applications to the user for selection further comprises displaying the visual context data in one or more user interface elements for user selection and copying of the visual context data.

5. The method of claim 4 further comprising placing most recently accessed applications in front of the user interface element to present most likely candidates for copying.

6. The method of claim 5 wherein the user interface element is implemented as an electronic flipbook having at least one page showing the visual context data of the open applications.

7. The method of claim 6 wherein the flipbook includes a series of pages that the user may cause to turn, and wherein the title and screenshot for each application is shown on a separate page of the flipbook.

8. The method of claim 1 wherein displaying visual content segments further comprises capturing the visual context including borders of elements comprising visual content from the applications by searching for a template that best defines a layout of the application.

9. The method of claim 8 wherein displaying visual content segments further comprises determining edge boundaries in the screenshot if a matching template cannot be found.

10. The method of claim 1 wherein copying the selected visual content segments further comprises further breaking down the content segments in response to a user input to generate sub-segments.

11. An executable software product stored on a computer-readable medium containing program instructions for enhanced copying and pasting between applications, the program instructions for:
   capturing information about open applications including a screenshot of each of the open applications shown in a viewable area of the open applications;
   in response to receiving a copy command while the user is interacting with a first application, presenting the screenshots of the other open applications to the user for selection;
   in response to the user selecting one of the screenshots corresponding to a second application, displaying visual content segments from the selected screenshot;
   in response to receiving a user selection of two or more of the visual content segments, copying the selected visual content segments; and
   inserting the selected visual content segments into the first application such that original spatial relations between the visual content segments from the second application are maintained when the visual content segments are inserted into the first application.

12. The executable software product of claim 11 wherein the program instructions for capturing information about open applications further comprises program instructions for querying an operating system to capture visual context data including a list of titles and the screenshot of the open applications that record visible items displayed on the display screen.

13. The executable software product of claim 11 further comprising program instructions for capturing the visual context data upon at least one of a context change in each application and on-demand of the user.

14. The executable software product of claim 11 wherein the program instructions for presenting the screenshots of the other open applications to the user for selection further comprises program instructions for displaying the visual context data in one or more user interface elements for user selection and copying of the visual context data.

15. The executable software product of claim 14 further comprises program instructions for placing most recently accessed applications in a front of the user interface element to present most likely candidates for copying.

16. The executable software product of claim 15 wherein the user interface element is implemented as an electronic flipbook having at least one page showing the visual context data of the open applications.

17. The executable software product of claim 16 wherein the flipbook includes a series of pages that the user may cause to turn, and wherein the title and screenshot for each application is shown on a separate page of the flipbook.

18. The executable software product of claim 11 wherein the program instructions for displaying visual content segments further comprises capturing the visual context including borders of elements comprising visual content from the applications by searching for a template that best defines a layout of the application.

19. The executable software product of claim 18 wherein the program instructions for displaying visual content segments further comprises determining edge boundaries in the screenshot if a matching template cannot be found.

20. The executable software product of claim 11 wherein the program instructions for copying the selected visual content segments further comprises further breaking down the content segments in response to a user input to generate sub-segments.

21. A system comprising:
   a computer comprising a memory, processor and a display screen;
   at least two open applications executing on the computer, each of the applications displaying respective visual content on the display screen;
   an enhanced capture and insert (ECI) module executing on the computer, the ECI module configured to:
      capture information about the open applications including a screenshot of each of the open applications shown in a viewable area of the open applications;
      in response to receiving a copy command while the user is interacting with a first application, present the screenshots of the other open applications to the user for selection;
      in response to the user selecting one of the screenshots corresponding to a second application, display visual content segments from the selected screenshot;
      in response to receiving a user selection of two or more of the visual content segments, copy the selected visual content segments; and
      insert the selected visual content segments into the first application such that original spatial relations between the visual content segments from the second application are maintained when the visual content segments are inserted into the first application.

22. The system of claim 21 wherein the ECI module captures information about open applications by querying an operating system to capture visual context data including a list of titles and the screenshot of the open applications that record visible items displayed on the display screen.

23. The system of claim 22 wherein the ECI module captures the visual context data upon at least one of a context change in each application and on-demand of the user.

24. The system of claim 21 wherein the ECI module presents the screenshots of the other open applications to the user for selection by displaying the visual context data in one or more user interface elements for user selection and copying of the visual context data.

25. The system of claim 24 wherein the ECI module places most recently accessed applications in a front of the user interface element to present most likely candidates for copying.

\* \* \* \* \*